Figure 1:
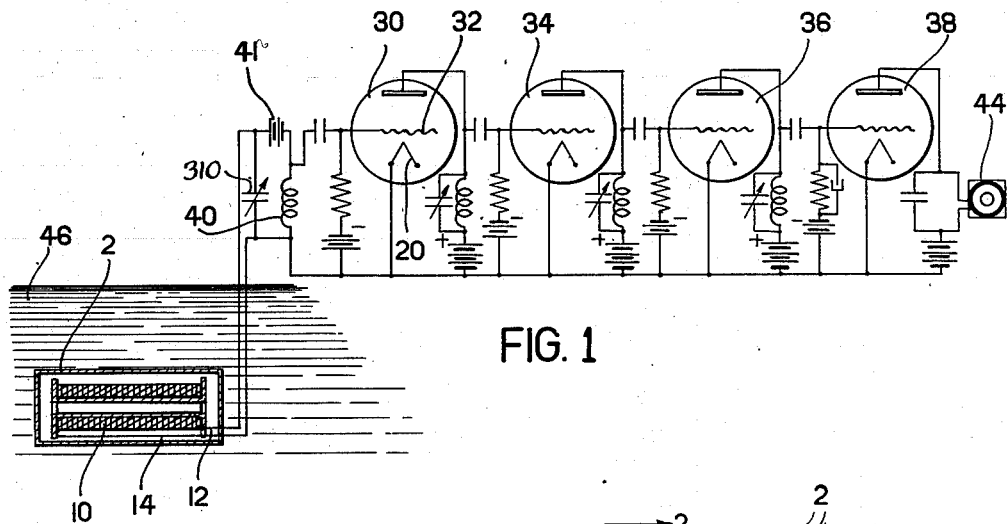

Dec. 15, 1936.  G. W. PIERCE  2,063,949
MAGNETOSTRICTIVE VIBRATOR
Filed Feb. 11, 1932  2 Sheets-Sheet 1

INVENTOR
George W. Pierce
BY
ATTORNEY

Dec. 15, 1936.  G. W. PIERCE  2,063,949
MAGNETOSTRICTIVE VIBRATOR
Filed Feb. 11, 1932  2 Sheets-Sheet 2

INVENTOR
*George W. Pierce*
BY *David Rines*
ATTORNEY

Patented Dec. 15, 1936

2,063,949

UNITED STATES PATENT OFFICE 2,063,949

MAGNETOSTRICTIVE VIBRATOR

George Washington Pierce, Cambridge, Mass.

Application February 11, 1932, Serial No. 592,320

5 Claims. (Cl. 177—386)

The present invention relates to vibratory systems and apparatus, and more particularly to electrical systems and apparatus employing electromechanical vibrators, particularly magnetostrictive devices.

Magnetostrictive devices, as at present known, comprises a magnetostrictive core with a winding therearound and cooperatively related thereto, the relation between the winding and the core being such that the current flowing through the winding is subjected to the reaction of the core due to the magnetostrictive effects. For many purposes, it is useful to protect the winding of the magnetostrictive vibrator against extraneous electromagnetic induction, or against current leakage and chemical action, as when the system is submerged in water, earth, or other conducting medium. It is also useful to provide cooling of the magnetostrictive vibrator, when it is used in such a manner as to cause it to heat by hysteresis or eddy currents. It is also useful to prevent the winding which actuates the magnetostrictive vibrator from acting by direct electromagnetic induction on other circuits of the system, as in magnetostrictive filters, or magnetostrictive frequency-controlling or frequency-transferring apparatus. Further, it is useful to position the coils of magnetostrictive vibrators in such a way as to permit the placing of several vibrators in a compact array.

Among the objects of the invention are the attainment of the above-enumerated, useful ends.

To the attainment of these ends, a magnetostrictive body is employed in the form of a nickel tube, or a tube of other active magnetostrictive material, efficiently driven as a mechanical vibrator by a coil or winding inside of the tube; and, conversely, the coil inside such a tube has an electromotive force efficiently produced in it when the tube is vibrated mechanically, and currents due to this electromotive force may be led out from the coil and utilized. One or more of the wires leading from the coil within the tube may be insulated from the tube and sealed water tight or air tight.

In the use of magnetostrictive devices associated with diaphragms for converting or translating acoustic energy into electric energy, or vice versa, certain difficulties are encountered in that various parts of the diaphragm may vibrate out of phase with one another, preventing proper focusing of the energy. One method of overcoming this difficulty is to use a number of small diaphragms side by side, with individual radiating faces vibrating in phase with one another.

Another method is to use a large diaphragm with a number of properly disposed magnetostrictive cooperating members. The presence of the energizing coils or windings, disposed about the individual magnetostrictive cores, however, has heretofore prevented placing the cores close together, or otherwise properly spacing them to give effective cooperation of the magnetostrictive members and the diaphragm or diaphragms.

One object of the invention, therefore, is to provide for greater compactness, or more accurate spacial disposition of parts, in designs of the above-described character. The compactness or proper spacing is rendered possible by the absence of the windings on the outside of the magnetostrictive cores. A plurality of tubes housing their respective windings may be placed closely together and attached at one end to a common support.

Another object is to provide a novel electromagnetic shielding between two coils so that electrical energy transferred from one coil to the other may be largely limited to the frequency of mechanical vibration. According to one embodiment of the invention, this may be effected by arranging additional windings outside the said tubes.

Other and further objects will be explained hereinafter, and will be particularly pointed out in the appended claims.

With the above ends in view, a feature of the invention resides in the use of a winding having an external field, and a housing of magnetostrictive material arranged in said external field and enclosing said winding.

Figure 2:
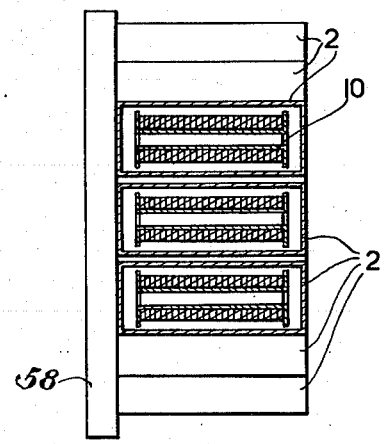
Figure 3:
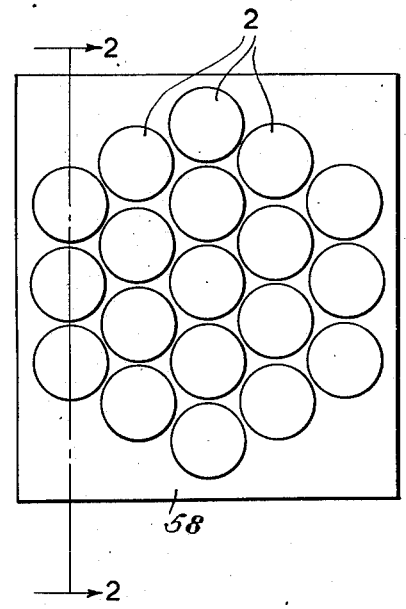
Figure 4:
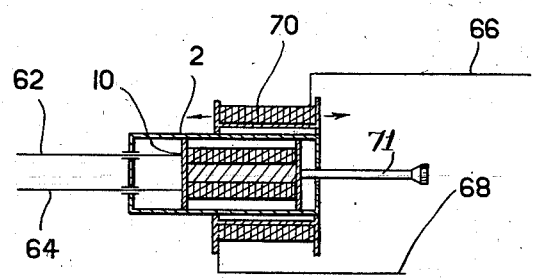
Figure 5:
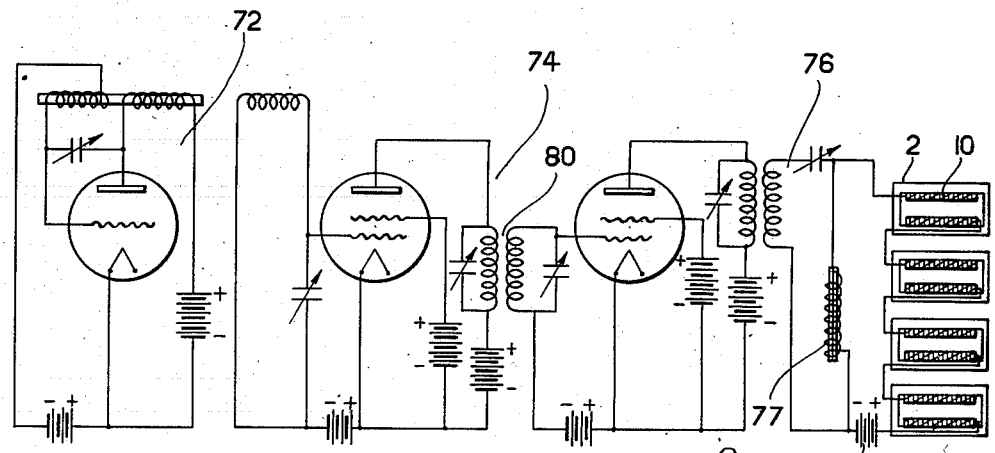
Figure 6:
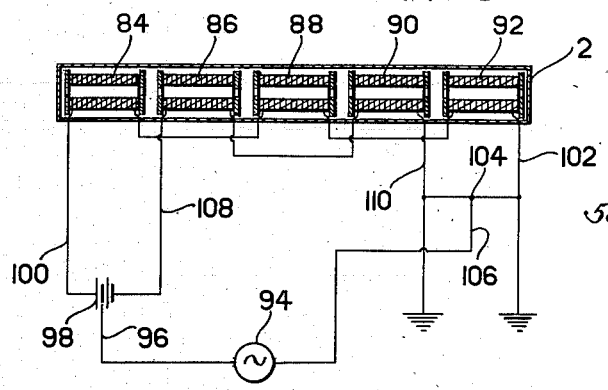
Figure 7:
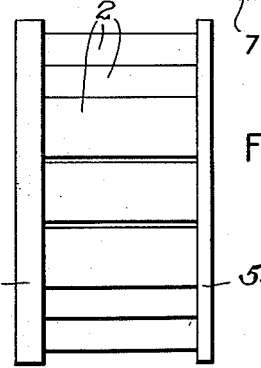

The invention will be explained in connection with the accompanying drawings, in which Fig. 1 is a diagrammatic view of circuits and apparatus constructed and arranged according to one embodiment of the present invention, for receiving purposes; Fig. 2 is a section of preferred apparatus, shown diagrammatically, the section being taken upon the line 2—2 of Fig. 3, looking in the direction of the arrows; Fig. 3 is a diagrammatic elevation of the same; Fig. 4 is a diagrammatic view illustrating an electromagnetic shield according to the present invention; Fig. 5 is a diagrammatic view, similar to Fig. 1, of a transmitter according to the present invention; and Figs. 6 and 7 are diagrammatic views of modifications.

The magnetostrictive member 2 is shown in the form of a tube, cylinder or shell, within which is axially positioned an inductive field coil or winding 10. The tube may be open-ended or it may be sealed. The tube constitutes a housing within which the winding is enclosed. It acts as an electromagnetic shield, and if sealed, it may act as a waterproof housing, so that the core may be submerged in water or other liquid, or may be buried in the earth, if desired.

The winding 10 is shown in Fig. 1 provided with conductors or leads 12 and 14, by means of which it is connected across a tuning condenser. The resulting circuit, comprising the winding 10 and the tuning condenser, is then connected, between the filament 20 and the grid 32, of a vacuum tube 30. A magnetizing battery 41 and an additional coil 40, which may be a choke coil, are also shown connected in the input circuit. The combination of circuits so formed is tunable by means of the tuning condenser. This tube 30 is coupled to a similar tube 34. A further stage of amplification, represented by a tube 36, and a detector tube 38, are illustrated, the output circuit of the last-named tube being coupled to a loud speaker 44. The various couplings, though illustrated as of the tuned-impedance type, may, of course, be of any desired form.

The winding 10 has a field that extends outside its limits, as well as inside. The inside field has heretofore been employed for magnetostriction purposes. A feature of the present invention is to employ the outside field.

The invention is adapted to many uses; and more particularly, as the cores are sealed against the entry of water when submerged in the ocean, to use as a sonic resonator or oscillator, for the reception and production of sounds of any desired frequency, particularly high frequencies, for communicating through water or other elastic media. The radiation of sound or the reception of sound may be from the end of the tube or from its side. Also, it may be used to cooperate with a diaphragm; for example, with the cone-shaped and the plate-shaped diaphragms disclosed in a copending application, Serial No. 591,838, filed February 9, 1932.

In Fig. 2, a plurality of sealed tube cores 2, of highly magnetostrictive material, like nickel, are shown disposed side by side, with their left-hand ends attached to a common supporting base 58, and with their right-hand ends facing in a predetermined direction, towards the right, as viewed in Fig. 2. The housing cores 2 each contains a coil 10, which coils may be connected together, in parallel or in series or in some parallel-series combination, as desired. These coils are designed to carry a periodic current, which may be superposed on a magnetizing direct current. The cores 2 may be free from side contact with one another. If it is desired to secure compactness, however, they may be close together or, for some purposes, substantially in contact with one another. To add to the compactness, the tube cores 2 may be arranged, as shown in Figs. 2 and 3. There are no outside coils on the tube cores 2 to prevent such a compact array. Advantage is taken of all of the mechanical tuning of which the system is capable.

A composite radiator is thus produced having a large number of active parts, all separated from one another, yet all free to vibrate without interaction other than that through their base 58 or through the medium. In order further to reduce interaction, the basal supports may be a skeletal arrangement, or the tubes may be otherwise interconnected, for example, at selected areas along their sides. The vibrations of the tubes are prevalently in the direction of their lengths, but there are also diametral expansions and contractions that may contribute to the production or reception of sound by the device. The internal-coil construction permits a proper spacing of the radiators to take advantage of the various cooperative effects of the vibrator elements.

If desired, a single diaphragm may be fixed to the free ends of the vibrators in such a way that it is driven simultaneously at many points in the same phase, or in cooperating phase. For instance, if the element 58 of Fig. 2 be considered as a diaphragm, it is then possible to pack the energizing members 2 closely together as illustrated. Or, again, 58 may be an inertia block, and a plate diaphragm 59, as illustrated in Fig. 7, may be affixed to the ends of the tubes 2 opposite to those attached to the element 58, and this diaphragm may be the radiating member. In either case, the radiating member may be circular, or rectangular, or it may have any other desired shape. Previously, with the necessity for external windings on the vibrators, it has sometimes been impossible to drive a thin diaphragm at points sufficiently close together, or otherwise properly spaced, to excite the whole surface in the same phase, or proper phase otherwise, to get high efficiency and directiveness.

Referring, now, to Fig. 4, in transferring electrical energy from one circuit, the terminals of which are shown at 62, 64, to another, the terminals of which are indicated at 66, 68, by the intermediation of a magnetostrictive vibrator 2, one coil 10, in the first-named circuit, according to the present invention, is placed inside of the vibrator 2, and another coil 70 is placed outside. The vibrator 2 thus acts as an electromagnetic shield, so that action of one of the coils on the other may be prevented to any desired extent, except at or near the frequency or frequencies which cause the vibrator 2 to vibrate. By suitably positioning one or both of the coils, the intensity and sharpness of frequency selection may be adjusted. The coils may be movable along the axis of the vibrator 2, as, for instance, by means of an adjusting handle 71. The outer coil, of course, may be adjusted by hand, as indicated by the arrows in the figure. There is a maximum of interconversion of electric energy in the coil and vibrational energy in the tube when the coil is situated at a node of vibrational displacement (which corresponds to a loop of pressure) in the tube. Consequently, for maximum efficiency of such transfer the coil should be adjusted to such a position. If, due to the loading effect of diaphragms or inertia members 58 attached to the tube the vibrational node is not central, its position may be determined by moving the coil along the tube until maximum transfer is attained.

Again, in the modification of Fig. 4, the maximum amount of energy at the resonant frequency of the tube 2 is transferred between the circuits 62—64 and 66—68 when the coils 10 and 70 are both situated at a node. If it is desired to reduce the amount of energy so transferred relative to energy transferred by other means (such as ordinary electrostatic or electromagnetic coupling between the circuits) either or both of the coils 10 and 70 may be moved away from the vibrational node by any desired amount. This arrangement of Fig. 4 is an important element in a magnetostrictive filter structure. It is also of use in my magnetostrictive, frequency-control apparatus, in which the grid coil and the plate coil of a vacuum-tube oscillator are coupled electrically by magnetostrictive action in a resonant, vibratory element common to both coils. In some cases, it is advantageous to eliminate direct, electromagnetic couping between the coils, while retaining the magnetostrictive coupling, and for this purpose, the arrangement of Fig. 4 is well suited.

A transmitting system according to the present invention is illustrated in Fig. 5. A magnetostrictively controlled master oscillator 72, which does not require detailed description, because it may be of the type disclosed in Patent No. 1,750,124, issued March 11, 1930, is shown coupled to a power amplifier 74 of any desired type, the output of which is coupled to the circuit 76 of a plurality of, say, series-connected, sealed-tube vibrators, bridged by a choke coil 77. A battery 78 may furnish the initial polarizing magnetization of the tube vibrators. The amplifier 74 is shown in two stages, coupled by tuned transformers at 80, but it will be understood that any other suitable coupling may be used equally well; thus, either the primary windings or the secondary winding of the transformer 80, or both, may be untuned, or the coupling may be of the tuned-impedance type, or it may be effected by means of properly designed iron-core transformers.

As illustrated in Fig. 6, a plurality of coils 84, 86, 88, 90 and 92 may be axially disposed, side by side, in a single magnetostrictive tube 2. The coils 84, 88 and 92 are connected in series in a circuit extending from a source 94 of alternating current, by way of a conductor 96, to a battery 98; thence, by way of a conductor 100, through the coils 84, 88, and 92, by way of a conductor 102, to a terminal 104; and thence, by way of a conductor 106, back to the source 94. The coils 86 and 90 are similarly series-connected to the battery 98 and the terminal 104 by conductors 108 and 110. The conductors 102 and 110 may be grounded, as shown.

As the conductors 100 and 108 are connected to opposite sides of the battery 98, however, direct current from the battery 98 traverses the coils 84, 88 and 92, on the one hand, and the coils 86 and 90 on the other, in opposite directions, thus producing opposite polarizing magnetic fields in the neighborhood of adjacently disposed coils. The coils 84, 88 and 92, for example, may produce positive or north poles, being in the same phase; and the coils 86 and 90, being in the opposite phase, may produce negative or south poles.

The alternating current thus travels through the coils 84, 86, 88, 90 and 92 in the same direction, but the direct, magnetizing current is reversed from coil section to coil section.

As a result of this arrangement of currents in the coils, the current in one coil, such as the coil 84, will cause the portion of the tube 2 near it to expand longitudinally; while the current in the next adjacent coil, such as the coil 86, will cause the corresponding, adjacent portion of the tube to contract longitudinally. Expansion of the tube will similarly take place near the coil 88, contraction near the coil 90, and expansion near the coil 92. The tube 2 is thus caused to have a phase of motion which alternates along the length of the tube, the tube being expanded near the coil 84, contracted near the coil 86, expanded near the coil 88, contracted near the coil 90, and expanded near the coil 92. When the current reverses, the expansions and contractions will, of course, be likewise reversed. A strong, harmonic vibration of the tube is thus produced. The diameters also change from section to section. Transverse and longitudinal vibration is thus produced simultaneously in the adjacently disposed, segmental sections of the tube core 2.

The tube may be regarded as having nodes near the middles of the coils, with maxima of motion half way between these nodes. The portion of the tube near the coil 84 will, therefore, exert a push to the right, due to the expansional effect of the field due to the coil 84. The portion of the tube near the coil 86 will similarly exert a pull to the right due to the contractile effect of the field due to the coil 86. This effect alternates with the alternations of the driving force.

All the coils will thus act cooperatively to reinforce or enhance the vibration of the core 2 in segments, as a unit, if the coils are separated by one-half wave length apart, to produce an effective, harmonic, standing-wave system in the vibrator tube core 2. The electric driving energy in all the coils is thus economized to drive the vibrator core 2 and preserve high frequency of vibration by vibrating the vibrator 2 in segments. At the same time, compactness is attained.

One of the practical utilities of the system illustrated in Fig. 6 is as a source of high-frequency sound. The arrangement shown causes the tube 2 to vibrate in harmonic sections, thus giving a higher frequency than could be obtained with the fundamental frequency of the tube.

At this high frequency, the arrangement permits the use of high power, driving the system by the cumulative action of the several coils.

An advantage in getting this high power by several coils instead of one coil, with a correspondingly higher current or voltage in that coil, is that excessive heating results with the single coil.

The arrangement of Fig. 6 gives large heat-radiating facility and a distribution of the heat over a large volume of material, and at the same time permits high-frequency sound radiation. Another practical utility is as a receiver for high-frequency sound, as in Fig. 1. In this case, if the received sound be such as to drive the tube harmonically, as above described, then each section of the vibrating tube will develop voltages in the coils, and the several coils will cooperate to apply these voltages to the grid 32 of Fig. 1, giving an enhanced effect.

This feature of the invention is obviously applicable to other magnetostrictive cores than those in tube form, such as rods. This feature is obviously likewise applicable to a plurality of windings arranged about a magnetostrictive rod and shielded by a housing of magnetostrictive material. It will further be clear that the parts may be so designed as to produce either transverse or longitudinal sound vibrations.

It will be understood that the invention is not restricted to the illustrated embodiments thereof, but is susceptible to further modifications and change within the skill of the artisan, and all such modifications and changes are considered to fall within the spirit and scope of the invention as defined in the appended claims.

What is claimed is:

1. A magnetostrictive vibrator comprising, in combination, a diaphragm, a plurality of substantially parallel, hollow cylinders of magnetostrictive material each intimately attached at one end to the diaphragm, said cylinders being closely spaced but not in rigid mechanical contact with one another, and a winding coaxially disposed within each cylinder, the windings being connected together in an electric circuit, whereby said plurality of cylinders, when magnetostrictively energized in longitudinal vibration by alternating current in said windings, cooperate to vibrate the diaphragm substantially pistonwise and, when energized by vibration of the diaphragm, cooperate to produce magnetostrictively an alternating electric voltage in said electric circuit.

2. A magnetostrictive vibrator comprising, in combination, a diaphragm, a plurality of substantially parallel, hollow, sealed cylinders of magnetostrictive material each intimately attached at one end to the diaphragm, said cylinders being closely spaced but not in rigid mechanical contact with one another, and a winding coaxially disposed within each cylinder, the windings being connected together in an electric circuit, whereby said plurality of cylinders, when magnetostrictively energized in longitudinal vibration by alternating current in said windings, cooperate to vibrate the diaphragm substantially pistonwise and, when energized by vibration of the diaphragm, cooperate to produce magnetostrictively an alternating electric voltage in said electric circuit.

3. A magnetostrictive vibrator comprising a tubular housing of highly magnetostrictive material having a central axis longitudinal of said housing, a winding for alternating currents disposed within said housing, said winding comprising turns wound about an axis substantially coincident with the axis of said housing, and, when traversed by electric currents, having an exterior magnetic field substantially longitudinal of said housing, whereby an alternating current in the winding produces by magnetostriction a longitudinal vibration in the housing and a longitudinal vibration of the housing produces magnetostrictively an alternating voltage in the winding.

4. A magnetostrictive vibrator comprising a tubular housing of highly magnetostrictive material having a central axis longitudinal of said housing, a winding for alternating currents disposed within said housing, said winding comprising turns wound about an axis substantially coincident with the axis of said housing, and, when traversed by electric currents, having an exterior magnetic field substantially longitudinal of said housing, whereby an alternating current in the winding produces by magnetostriction a longitudinal vibration in the housing and a longitudinal vibration of the housing produces magnetostrictively an alternating voltage in the winding, said tubular housing being magnetically polarized.

5. A magnetostrictive vibrator comprising a tubular housing of highly magnetostrictive material having a central axis longitudinal of said housing, a winding for alternating currents disposed within said housing, said winding comprising turns wound about an axis substantially coincident with the axis of said housing, and, when traversed by electric currents, having an exterior magnetic field substantially longitudinal of said housing, whereby an alternating current in the winding produces by magnetostriction a longitudinal vibration in the housing and a longitudinal vibration of the housing produces magnetostrictively an alternating voltage in the winding, and the housing being sealed to protect the winding against moisture.

GEORGE W. PIERCE.